(12) United States Patent
Roy et al.

(10) Patent No.: US 9,841,804 B2
(45) Date of Patent: Dec. 12, 2017

(54) CLOCKING A PROCESSOR

(75) Inventors: Subrata Roy, Austin, TX (US);
Xiaohui Wang, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 874 days.

(21) Appl. No.: 13/402,285

(22) Filed: Feb. 22, 2012

(65) Prior Publication Data

US 2013/0219199 A1    Aug. 22, 2013

(51) Int. Cl.
| G06F 1/00 | (2006.01) |
| G06F 1/26 | (2006.01) |
| G06F 1/32 | (2006.01) |
| G06F 1/04 | (2006.01) |
| G06F 13/24 | (2006.01) |
| G06F 9/44 | (2006.01) |
| G06F 1/08 | (2006.01) |
| G06F 1/06 | (2006.01) |

(52) U.S. Cl.
CPC .......... G06F 1/324 (2013.01); G06F 9/4418 (2013.01); *G06F 1/06* (2013.01); *G06F 1/08* (2013.01); *G06F 13/24* (2013.01); *Y02B 60/1217* (2013.01)

(58) Field of Classification Search
CPC . G06F 1/324; G06F 1/08; G06F 13/24; G06F 9/4418; G06F 1/06; Y02B 60/186
USPC ............... 713/300, 320, 322, 323, 501, 600; 710/260
See application file for complete search history.

(56) References Cited

U.S. PATENT DOCUMENTS

| 5,774,701 | A  | *  | 6/1998  | Matsui ...................... G06F 1/08 |
|           |    |    |         | 713/501 |
| 5,790,609 | A  | *  | 8/1998  | Swoboda ....................... 375/357 |
| 5,848,281 | A  | *  | 12/1998 | Smalley et al. .............. 713/322 |
| 6,405,320 | B1 | *  | 6/2002  | Lee et al. ...................... 713/300 |
| 6,934,870 | B1 | *  | 8/2005  | Amos .......................... 713/501 |
| 2002/0026596 | A1 | * | 2/2002 | Kim ............................ 713/322 |
| 2003/0023889 | A1 | * | 1/2003 | Hofstee ................. G06F 1/3203 |
|           |    |    |         | 713/322 |
| 2003/0159076 | A1 | * | 8/2003 | Delisle et al. ................ 713/300 |
| 2003/0159080 | A1 | * | 8/2003 | Kiriake ..................... G06F 1/08 |
|           |    |    |         | 713/500 |
| 2004/0221187 | A1 | * | 11/2004 | Durand et al. ................ 713/300 |
| 2005/0138249 | A1 | * | 6/2005 | Galbraith ............... G06F 15/17 |
|           |    |    |         | 710/100 |
| 2008/0189563 | A1 | * | 8/2008 | Itkin ............................ 713/300 |
| 2009/0157936 | A1 | * | 6/2009 | Goss ..................... G06F 1/3203 |
|           |    |    |         | 710/264 |
| 2009/0319817 | A1 | * | 12/2009 | Kallam .......................... 713/500 |
| 2013/0067258 | A1 | * | 3/2013 | Furuya et al. ................ 713/322 |
| 2013/0212408 | A1 | * | 8/2013 | Fernald .......................... 713/300 |

* cited by examiner

*Primary Examiner* — Ji H Bae
(74) *Attorney, Agent, or Firm* — Trop, Pruner & Hu, P.C.

(57) ABSTRACT

A technique includes clocking a processor; and in response to the processor providing a signal indicating that the processor is transitioning between a first power state that is associated with a first power consumption and a second power state that is associated with a second power consumption different than the first power consumption, changing a frequency of the clocking.

15 Claims, 5 Drawing Sheets

CLOCKING A PROCESSOR

BACKGROUND

An electronics device may include a microcontroller unit (MCU) that may be used to perform a number of different applications. The MCU may include a processor core that, for example, processes incoming and outgoing streams of data for the electronic device. As a more specific example, in a mobile telecommunications device, the processor core may process data that is communicated over a wireless network.

For purposes of communicating with its peripherals, processing data and so forth, the processor core may operate in an active mode in which the processor core consumes a relatively large amount of power. For purposes of conserving power when the processor core is relatively inactive, the processor core may transition into a lower power consumption state.

SUMMARY

In an exemplary embodiment, a technique includes clocking a processor; and in response to the processor providing a signal indicating that the processor is transitioning between a first power state that is associated with a first power consumption and a second power state that is associated with a second power consumption different than the first power consumption, changing a frequency of the clocking.

In another exemplary embodiment, an apparatus includes a processor and a clock selection circuit. The processor is adapted to operate in a first power state that is associated with a first power consumption and a second power state that is associated with a second power consumption greater than the first power consumption. The clock selection circuit is adapted to, in response to the processor operating in the first power state, regulate a clock frequency of the processor without relying on execution of software by the processor.

In yet another exemplary embodiment, a system includes an integrated circuit and at least one peripheral. The integrated circuit includes a processor and a clock selection circuit. The processor is adapted to operate in a first power state that is associated with a first power consumption and operate in a second power state that is associated with a second power consumption, which is different than the first power consumption. The peripheral(s) are adapted to communicate with the processor in response to the processor operating in the second power state. The clock selection circuit is adapted to provide a first clock signal to the processor when the processor is in the first power state, and in response to the processor providing a signal indicating that the processor is transitioning to a second power state, provide a second clock signal to the processor.

Advantages and other desired features will become apparent from the following drawing, description and claims.

DETAILED DESCRIPTION

Figure 1:
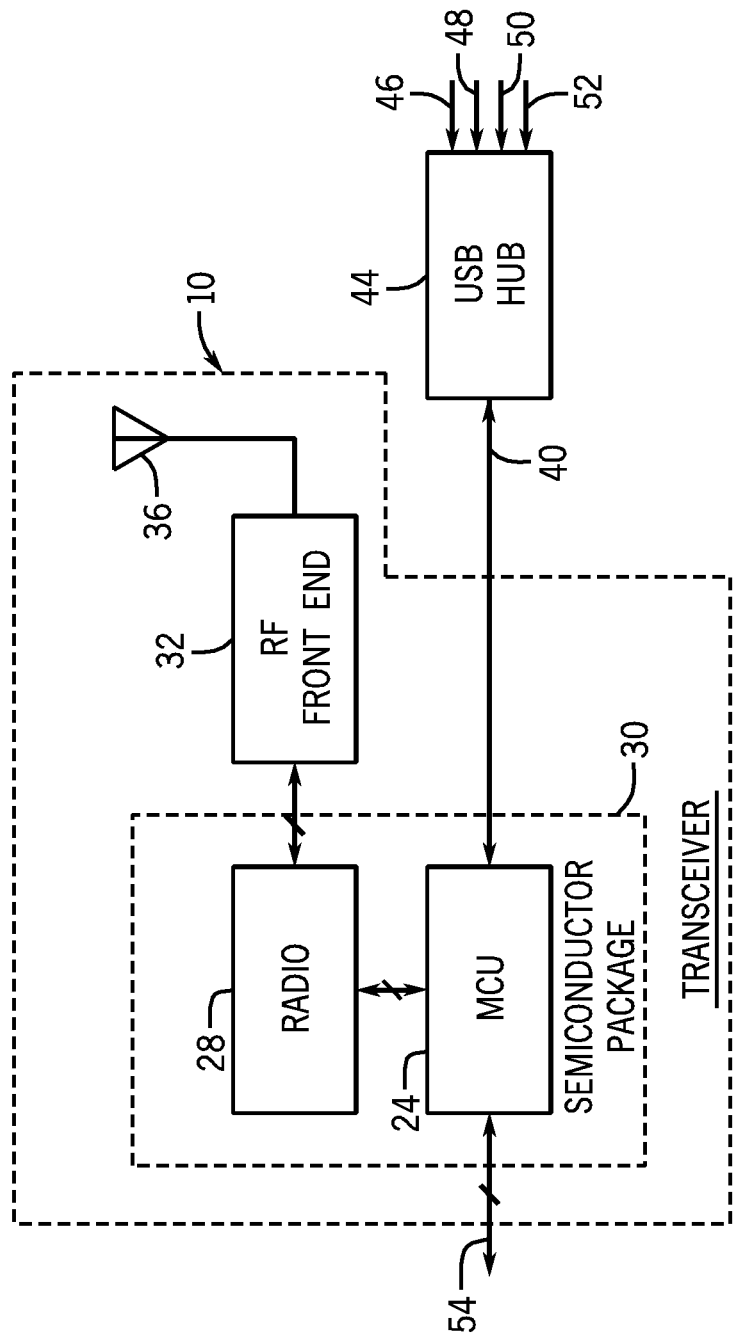
FIG. 1 is a schematic diagram of a transceiver system according to an exemplary embodiment.

Referring to FIG. 1, in accordance with some embodiments that are disclosed herein, an embedded microcontroller unit (MCU) 24 may be used in a variety of applications, such as applications in which the MCU 24 controls various aspects of a transceiver 10 (as a non-limiting example). In this regard, the MCU 24, for this particular example, may be part of an integrated circuit (IC), or semiconductor package 30, which also includes a radio 28. As a non-limiting example, the MCU 24 and the radio 28 may collectively form a packet radio, which processes incoming and outgoing streams of packet data. To this end, the transceiver 10 may further include a radio frequency (RF) front end 32 and an antenna 36, which receives and transmits RF signals (frequency modulated (FM) signals, for example) that are modulated with the packet data.

As non-limiting examples, the transceiver 10 may be used in a variety of applications that involve communicating packet stream data over relatively low power RF links and as such, may be used in wireless point of sale devices, imaging devices, computer peripherals, cellular telephone devices, etc. As a specific non-limiting example, the transceiver 10 may be employed in a smart power meter which, through a low power RF link, communicates data indicative of power consumed by a particular load (a residential load, for example) to a network that is connected to a utility. In this manner, the transceiver 10 may transmit packet data indicative of power consumed by the load to mobile meter readers as well as to an RF-to-cellular bridge, for example. Besides transmitting data, the transceiver 10 may also receive data from the utility or meter reader for such purposes (as non-limiting examples) as inquiring as to the status of various power consuming devices or equipment; controlling functions of the smart power meter; communicating a message to a person associated with the monitored load, etc.

As depicted in FIG. 1, in addition to communicating with the radio 28, the MCU 24 may further communicate with other devices and in this regard may, as examples, communicate over communication lines 54 with a current monitoring and/or voltage monitoring device of the smart power meter as well as communicate with devices over a serial bus 40. In this manner, the serial bus 40 may include data lines that communicate clocked data signals, and the data may be communicated over the serial bus 40 data in non-uniform bursts. As a non-limiting example, the serial bus may be a Universal Serial Bus (USB) 40, in accordance with some implementations. As described herein, in addition to containing lines to communicate data, the serial bus, such as the USB 40, may further include a power line (a 5 volt power line, for example) for purposes of providing power to serial bus devices, such as the MCU 24. Various USB links 46, 48, 50 and 52 may communicate via a hub 44 with USB 40 and with the transceiver 10 for such purposes as communicating with a residential computer regarding power usage of various appliances, communicating with these appliances to determine their power usages, communicating with the appliances to regulate their power usages, etc.

Figure 2:
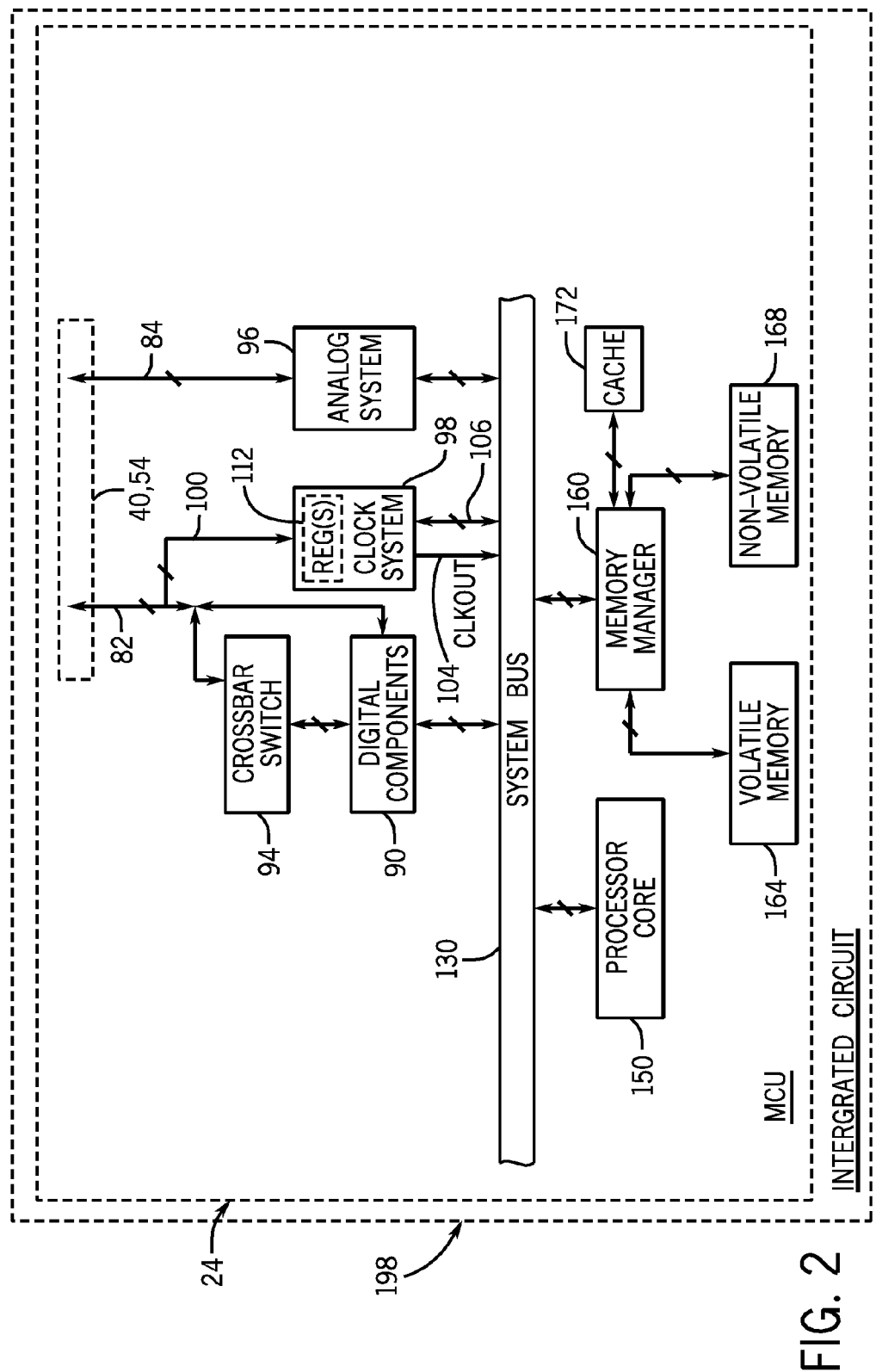
FIG. 2 is a schematic diagram of a microcontroller unit of the system of FIG. 1 according to an exemplary embodiment.

Referring to FIG. 2, in accordance with some embodiments, all or part of the components of the MCU 24 may be part of an integrated circuit 198. For example, all or part of the components of the MCU 24 may be fabricated on a single die or on multiple dies of a semiconductor package (the semiconductor package 30, for example, or another semiconductor package, as another example).

Among its components, the MCU 24 includes a processor core 150. As a non-limiting example, the processor core 150 may be a 32-bit core, such as the Advanced RISC Machine (ARM) processor core, which executes a Reduced Instruction Set Computer (RISC) instruction set. In general, the processor core 150 communicates with various other system components of the MCU 24, such as a memory controller, or manager 160, over a system bus 130. In general, the memory manager 160 controls access to various memory components of the MCU 24, such as a cache 172, a non-volatile memory 168 (a Flash memory, for example) and a volatile memory 164 (a static random access memory (SRAM), for example).

For purposes of producing clock signals for use by the components of the MCU 24, such as the processor core 150, the MCU 24 includes a clock system 98. As depicted in FIG. 2, for purposes of an example, the clock system 98 is depicted as providing a system clock signal called "SYSCLK" in FIG. 2 to the system bus 130. In some embodiments, the clock system 98 recovers a clock signal used in the communication of bursty data on data lines over the USB 40 and may use this recovered clock signal as the system clock signal.

The MCU 24 includes various digital components 90, such as peripherals that communicate with the processor core 150. As non-limiting examples, the peripherals may include a USB interface, a programmable counter/timer array (PCA), a universal asynchronous receiver/transmitter (UART), a system management bus (SMB) interface, a serial peripheral (SPI) interface, and so forth. The MCU unit 24 may include a crossbar switch 94, which permits the programmable assigning of the digital peripheral components 90 to digital output terminals 82 of the MCU 24. In this regard, the MCU 24 may be selectively configured to selectively assign certain output terminals 82 to the digital peripheral components 90.

In accordance with some embodiments, the MCU 24 includes an analog system 96, which communicates analog signals on external analog terminals 84 of the MCU 24 and generally forms the MCU's analog interface. As an example, the analog system 96 may include various components that receive analog signals, such as analog-to-digital converters (ADCs), comparators, etc.; and the analog system 96 may include components (supply regulators) that furnish analog signals (power supply voltages, for example) to the terminals 84, as well as other analog components, such as current drivers.

In accordance with exemplary embodiments disclosed herein, the clock system 98 provides a clock signal (called "CLKOUT" in FIG. 2) signal on a clock communication line 104, which is received by a corresponding clock input terminal of the processor core 150. As described further herein, the clock system 98 selects one of a plurality of different frequency clock signals to be the CLKOUT signal for purposes of clocking the processor core 150, depending on the power consumption state of the processor core 150.

As non-limiting examples, the clock signals available for the clock system's selection includes a relatively low frequency clock signal that may be provided by a real time clock (RTC) oscillator of the MCU 24 (as a non-limiting example), a higher frequency clock signal that may be provided by an internal trimmable oscillator of the MCU 24 (as another non-limiting example), a yet higher frequency clock signal that is provided by a boot-up oscillator of the MCU (as another non-limiting example), and so forth. As described further herein, the particular clock signal that is used for purposes of clocking the processor core 150 is based on the current power consumption state of the processor core 150.

More specifically, in accordance with some embodiments, when processing data, executing instructions, communicating with the peripherals, and so forth, the processor core 150 operates in an active mode, in which the processor core 150 is clocked at a relatively high frequency. In this manner, for its active mode, the processor core 150 may be clocked using the boot oscillator of the MCU 24 (i.e., the clock system 98 sets the CLKOUT signal to the boot oscillator clock signal for the active mode). In the active mode, the processor core 150 operates in its highest power consumption state. Therefore, for purposes of conserving power when the processor core 150 is relatively inactive, the MCU 24, through the clock system 98, transitions the processor core 150 into a relatively lower power consumption state.

As a more specific example, in accordance with some exemplary embodiments, when the processor core 150 is relatively inactive (not processing data or communicating with peripherals, for example), the MCU 24 transitions the processor core 150 into a suspend mode of operation, a mode in which the processor core 150 operates at a lower frequency and in general, is associated with a relatively lower power consumption state. In the suspend mode, the MCU 24 operates the processor core 150 at a relatively lower clock frequency. As a non-limiting example, in the suspend mode, the processor core 150 may be clocked using the relatively low frequency RTC clock signal (i.e., the clock system 98 sets the CLKOUT signal to the RTC clock signal) for the suspend mode.

Figure 4:
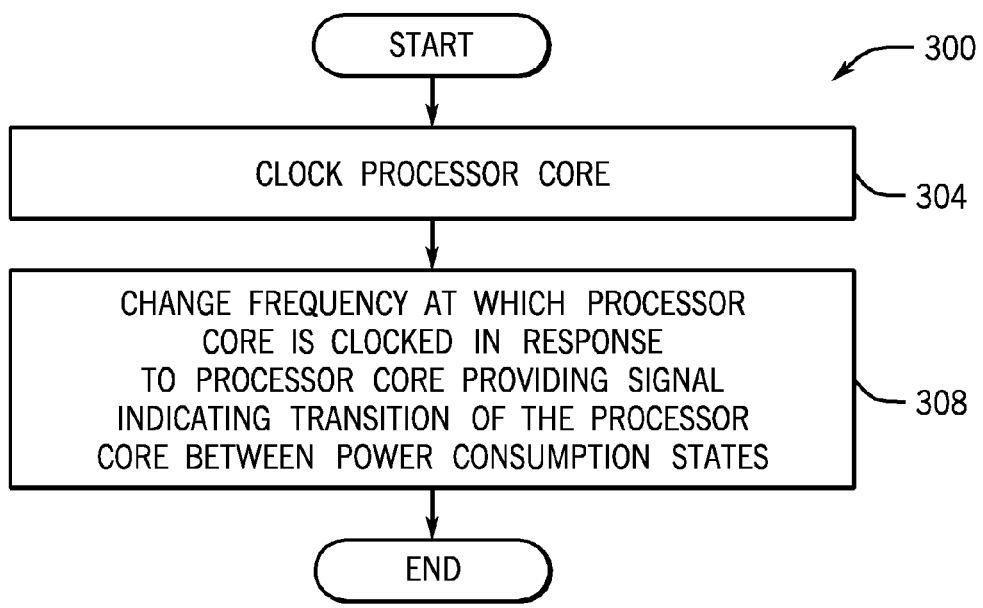
FIGS. 4 and 5 are flow diagrams depicting techniques to regulate clocking of a processor core of the microcontroller unit according to exemplary embodiments.

Referring to FIG. 4 in conjunction with FIG. 2, in accordance with some embodiments, the MCU 24 uses the clock system 98 to perform a technique 300 for purposes of regulating the clocking of the processor core 150. Pursuant to the technique 300, the clock system 98 provides a clock signal which is selected from a plurality of clock signals to the processor core 150 for purposes of clocking (block 304) the processor core 150. The clock system 98 changes (block 308) the frequency of the clocking (such as by changing selection of the clock signal that is provided to the processor core, for example) in response to the processor core 150 providing a signal that indicates transition of the processor core 150 between power consumption states.

The clock system's regulation of the processor core's clock signal (as opposed to the processor core 150 executing one or more instructions to perform this regulation, for example) results in a time efficiency in transitioning the processor core 150 between power consumption states. One advantage is the time efficiency in "waking up" the processor core 150 from the suspend mode, as the processor core 150 operates at a relatively high clock frequency to execute the corresponding wake up interrupt service routine. Moreover, due to this time efficiency, the processor core 150 may remain in the suspend mode for a relatively longer period of time, thereby resulting in power dissipation savings.

Figure 3:
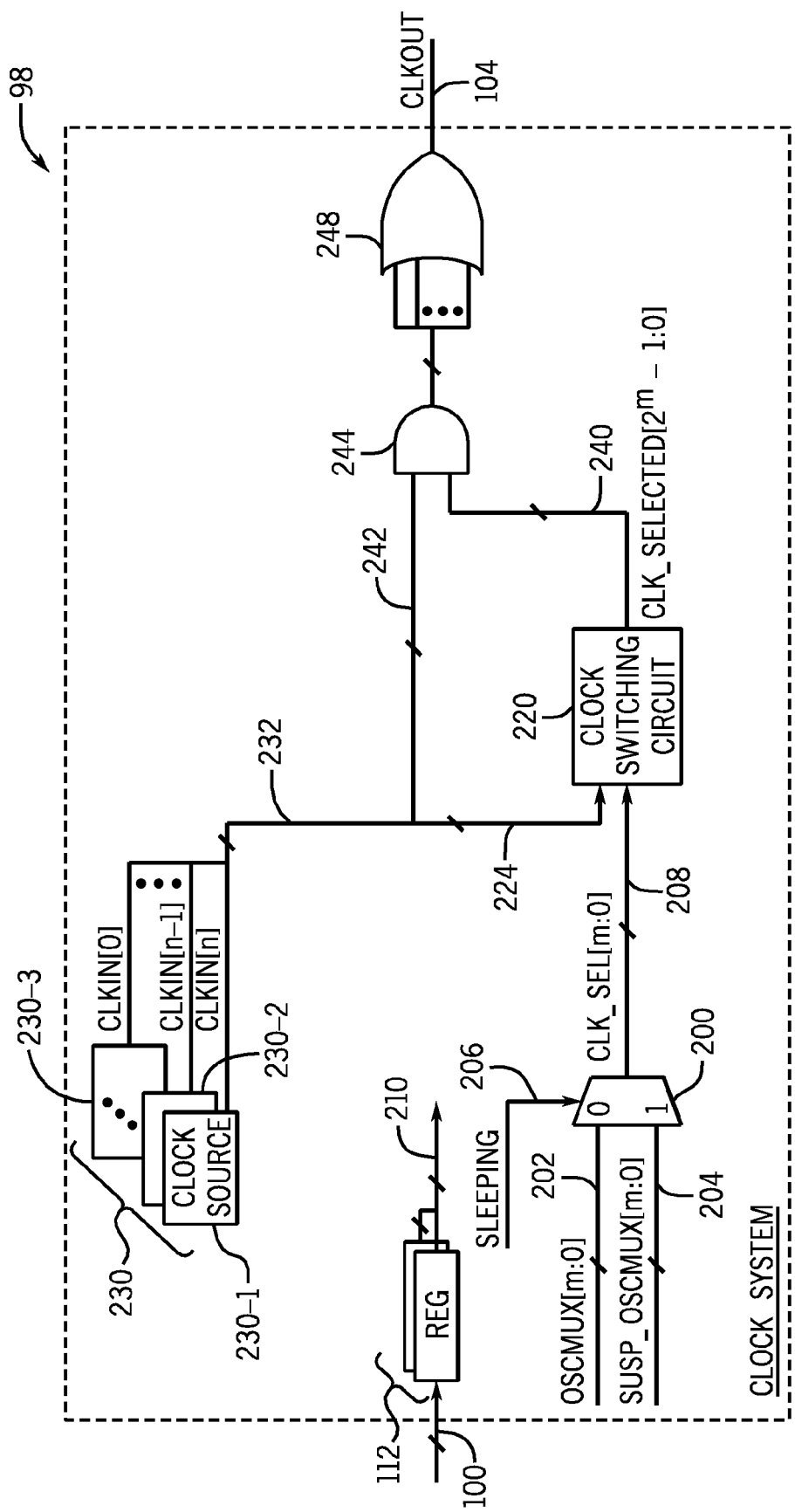
FIG. 3 is a schematic diagram of a clock system of the microcontroller unit of FIG. 2 according to an exemplary embodiment.

Referring to FIG. 3, as a more specific example, in accordance with exemplary embodiments, the clock system 98 may include a plurality of clock sources 230 (clock sources 230-1, 230-2 and 230-3, being depicted in FIG. 3, as non-limiting examples), which provide associated clock signals (clock signals CLKIN[0], CLKIN[n−1] and CLKIN[n], as depicted in FIG. 3) that have a wide range of frequencies to corresponding clock communication lines 232. As a non-limiting example, the clock source 230-1 may include a boot-up oscillator and a phase locked loop (PLL), which provides a relatively high frequency CLKIN[n] clock signal that the clock system 98 generally uses to clock the processor core 150 (i.e., provides as the CLKOUT clock signal to the processor core 150) during the processor core's active mode. In accordance with some embodiments, the PLL of the clock source 230-1 is controllable by the processor core 150, via the execution of one or more instructions, for such purposes as initializing the PLL to enable the PLL's operation for the active mode, disabling the PLL for the suspend mode, and so forth.

The clock source 230-2, in accordance with some embodiments, is an internal trimmable oscillator of the MCU 24, which provides a clock signal (called "CLKIN[n−1]" in FIG. 3), which has a frequency that is lower than the frequency of the CLKIN[n] clock signal. As further described herein, the clock system 98 provides the CLKIN[n−1] clock signal to the processor core 150 for purposes of clocking the processor core 150 during transition of the processor core 150 between the core's active and suspend modes of operation. The clock source 230-3 may be a real time clock (RTC) oscillator, which provides the relatively lowest (for this example) frequency clock signal, called "CLKIN[0]," in FIG. 3, which, as further described below, is used to clock the processor core 150 during the processor core's suspend mode.

In general, the clock system 98 selects one of the clock signals provided by the clock sources 230 to the clock communication lines 232 and provides the selected clock signal (as the CLKOUT signal) to the processor core's input clock terminal. The selection of the particular clock signal is, in general, controlled, depending on the operating mode of the processor core 150: in its active mode, the processor core 150 may execute one or more instructions for purposes of selecting the clock signal that is provided to the processor core 150; and when the processor core is operating in the suspend mode, the clock system 98 controls the clock signal that is provided to the processor core 150.

In accordance with some embodiments, bits in one or more registers 112 of the MCU 24 control which clock signals are used to clock the processor core 150. In this manner, one or more registers 112 of the MCU 24 may be programmable via read/write accessible terminals 100 of the register(s) 112, for purposes of controlling the clock signals that are provided to the processor core 150 during the active and suspend modes of operation. As shown in FIG. 3, in general, the register(s) 112 provide signals indicative of the register bits to output lines 210 for purposes of controlling clock selections, as further described below.

In accordance with some embodiments, the register(s) 112 store m+1 bits, represented in FIG. 3 by an m+1 multiple bit signal called "OSCMUX[m:0]," which indicates selection of a particular clock source 230 during the active mode of the processor core 150. The register(s) 112 further store m+1 bits represented in FIG. 3 by an m+1 multiple bit signal called, "SUSP_OSCMUX[m:0]," which indicates a selection of a clock source 230 during the suspend mode. As depicted in FIG. 3, in accordance with some embodiments, the OSCMUX[m:0] and SUSP_OSCMUX[m:0] signals are provided to multiple bit input terminals 202 and 204, respectively, of a multiplexer 200, which receives a signal called "SLEEPING," at its select terminal 206. The SLEEPING signal is generated by the processor core 150 to indicate whether the processor core 150 is operating in the active mode (indicated by the de-assertion of the SLEEPING signal, for example) or operating in the suspend mode (indicated by the assertion of the SLEEPING signal, for example). Thus, the processor core 150 changes logical states of the SLEEPING signal, as the processor core 150 transitions (either way) between the active and suspend modes.

The multiplexer 200 provides an m+1 multiple bit signal called "CLK_SEL[m:0]," which indicates the selected clock source 230. In this manner, during the active mode of the processor core 150 (when the SLEEPING signal is de-asserted), the multiplexer 200 selects the input lines 202; and as a result, the CLK_SEL[m:0] signal is equated to the OSCMUX[m:0] signal. Conversely, when the SLEEPING signal is asserted to indicate the suspend mode, the multiplexer 200 equates the CLK_SEL[m:0] to the SUSP_OSCMUX[m:0] signal. Thus, the clock system 98 selects a particular clock source 230, depending on the bits in the register(s) 112 and whether or not the processor core 150 is in the active mode or in the suspend mode, as indicated by the logical state of the SLEEPING signal.

The CLK_SEL[m:0] signal is communicated to clock selection input terminals 208 of a clock switching circuit 220. The clock switching circuit 220 also has input terminals 224 that are coupled to the clock signals 232 that are provided by the clock sources 230. In general, the clock switching circuit 220 provides a $2^m$ multiple bit signal called "CLK_SELECTED[$2^m$-1:0]" on its output terminals 240. One of the bits of the CLK_SELECTED[$2^m$-1:0] signal is asserted (driven to a logic one value, for example) to indicate the clock source 230 that is currently providing the CLKOUT clock signal to the processor core 150; and the other bits of the CLK_SELECTED[$2^m$-1:0] signal are de-asserted (driven to logic zero values, for example). In general, the clock switching circuit 220 regulates the transition of one selected clock signal to the other in a manner that avoids overlapping clock signal states. In general, the clock switching circuit 220 asserts the appropriate bit of the CLK_SELECTED[$2^m$-1:0] signal if this bit matches a corresponding bit of the CLK_SEL[m:0] signal and no other clock signal is active.

As depicted in FIG. 3, in accordance with some embodiments, the clock system 98 includes an AND gate 244, which performs a bitwise AND operation between input terminals 240 of the AND gate 244, which receive respective bits of the CLK_SELECTED[$2^m$-1:0] signal and the clock signals that are provided by the clock sources 230, which appear on the input terminals 242 of the AND gate 244. Thus, the selected clock signal appears on one terminal of the set of output terminals of the AND gate 244. For purposes of selecting the active clock signal, an OR gate 248 has its input terminals coupled to the output terminals of the AND gate 244 and provides the CLKOUT signal at its output terminal, which forms the output terminal 104 for the clock system 98.

It is noted that the clock system 98 may have many other architectures, other than the one that is depicted in FIG. 3, in accordance with other embodiments. Moreover, in accordance with some embodiments, the clock system 98 may include other circuitry (not shown in FIG. 3), which provides clock signals on one or more additional output terminals 106 (see FIG. 2) of the clock system 98. Thus, many variations are contemplated, which are within the scope of the appended claims.

In accordance with some embodiments, the processor core 150 executes one or more instructions while in the active mode for purposes of transitioning the processor core 150 from being clocked at the highest frequency clock signal to being clocked at an intermediate clock frequency in preparation for the suspend mode. After the processor core 150 transitions into the suspend mode and correspondingly asserts the SLEEPING signal, the clock system 98 takes over regulation of the clock signal to the processor core 150 during the suspend mode. In this manner, during the suspend mode, the clock system 98, in general, provides the lowest frequency clock signal to the processor core 150, and in response to a "wake up" signal occurring, such as an interrupt, for example, the clock system 98 transitions the clock frequency of the processor core 150 to a higher clock frequency by providing an intermediate frequency clock signal to the processor core 150. Using this intermediate frequency clock signal, the processor core 150 executes one or more instructions to transition the processor core 150 back to the active mode, including executing one or more instructions to cause the core 150 to once again be clocked at the highest clock frequency.

Figure 5:
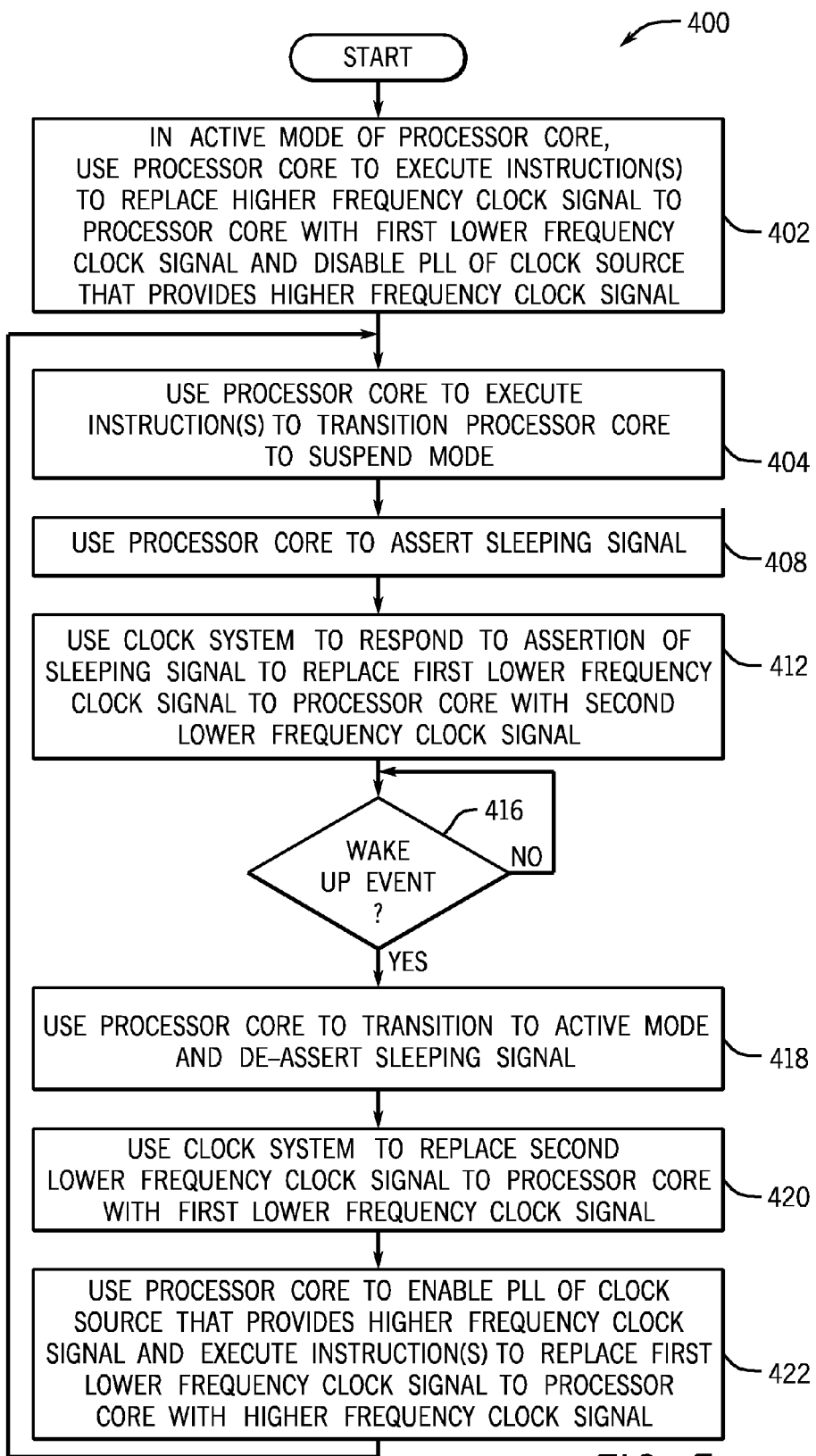

More specifically, referring to FIG. 5 in conjunction with FIG. 2, in accordance with some embodiments, the processor core 150 and clock system 98 may perform a technique 400 when the processor core 150 transitions from the active mode to the suspend mode and then transitions from the suspend mode back to the active mode. To prepare for the suspend mode, the processor core is used (block 402) in its active mode to execute one or more instructions to replace the clock signal to the processor core with a first lower frequency clock signal and using this first lower frequency clock signal, the processor core 150 disables the phase locked loop (PLL) of the clock source that provides the higher frequency clock signal to the processor core 150 during the active mode. Thus, the processor core 150 prepares to enter the suspend mode by first lowering its clock frequency and then using the lowered clock frequency to execute at least one instruction to disable the PLL of the higher frequency clock source. Referring also to FIG. 3, as a non-limiting example, the processor core 150 may execute one or more instructions to change one or more bits in the register(s) 112 for purposes of changing the OSCMUX[m:0] signal to select the first lower frequency clock signal. Next, in accordance with some embodiments, the processor core executes one or more instructions (a WFI instruction or a WFE instruction, for example) to transition (block 404) the processor core 150 to the suspend mode, as which point the processor core 150 asserts (drives to a logic one value, for example) the SLEEPING signal, pursuant to block 408.

During the suspend mode of the processor core 150, the clock system 98 controls the clock signal that is provided to the processor core 150. More specifically, in response to the assertion of the SLEEPING signal, the clock system 98 is used, pursuant to block 412, to replace the first lower frequency clock signal that is provided to the processor core with a second lower frequency clock signal. Thus, as a non-limiting example, during its active mode, the processor core may operate using the boot oscillator clock signal; during the disabling of the PLL, the processor core 150 may operate using the internal trimmable oscillator; and, as controlled by the clock system 98, during the suspend mode, the processor core 150 may be clocked by the lowest frequency RTC oscillator clock signal.

The clock system 98 provides the second low frequency clock signal to the processor core 150 during the suspend mode until a wake up event occurs, as indicated in decision block 416. In this manner, as a non-limiting example, a particular peripheral (a bus interface peripheral, for example) may assert an interrupt signal, which is routed to the processor core 150 and causes the processor core 150 to execute one or more instructions to transition the core 150 to the active mode; and as a result, the processor core 150 de-asserts (drives to a logic zero value, for example) the SLEEPING signal, pursuant to block 418.

Pursuant to the technique 400, in response to the de-assertion of the SLEEPING signal, the clock system 98 replaces the second lower frequency clock signal that is provided to the processor core 150 during the suspend mode with the first lower frequency clock signal, pursuant to block 420. Thus, as a non-limiting example, in accordance with some embodiments, the clock system 98 replaces the RTC oscillator clock signal with the slightly higher frequency, internal trimmable oscillator signal. The processor core 150 then uses (block 422) the first lower frequency signal to execute one or more instructions to enable the PLL of the clock source (the boot oscillator clock source, for example) that provides the higher frequency clock signal and executes one or more instructions to transition the clock signal to the processor core to the relatively high frequency clock signal (the boot oscillator clock signal, for example), pursuant to block 422.

The technique 400 may be advantageous in a variety of applications. One example is for relatively advanced processors that employ pipelining, such as a 32-bit core Advanced RISC Machine (ARM) processor core, as a non-limiting example, which may have a relatively significant wakeup latency, i.e., a significant number of cycles between the wakeup event and the execution of the first instruction after the wakeup event.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. A method comprising:
   clocking a processor core at a first frequency in response to the processor core being in a first power state associated with a first power consumption;
   transitioning the processor core to a second power state associated with a second power consumption less than the first power consumption, wherein transitioning the processor core comprises executing at least one instruction by the processor core to cause the processor core to be clocked at a second frequency less than the first frequency;
   asserting a first signal by the processor core to indicate that the processor core has entered the second power state; and
   in response to the first signal, regulating clocking of the processor core by a clock circuit other than the processor core, wherein regulating the clocking comprises providing a clock signal to clock the processor core at a third frequency less than the second frequency.

2. The method of claim 1, further comprising:
   in response to a wake up signal, using the clock circuit to provide another clock signal to clock the processor core at a fourth frequency greater than the third frequency;
   while the processor core is being clocked at the fourth clock frequency, executing at least one instruction by the processor core to cause the processor core to be clocked at a fifth clock frequency greater than the fourth clock frequency.

3. The method of claim 2, wherein the wake up signal comprises an interrupt signal.

4. The method of claim 2, wherein the second and fourth frequencies are the same.

5. The method of claim 2, wherein the first and fifth clock frequencies are the same.

6. The method of claim 1, wherein the first power state comprises a state associated with an active mode for the processor core and the second power state comprises a state associated with a suspend mode for the processor core.

7. An apparatus comprising:
a processor core to:
be clocked at a first clock frequency in a first power state of the processor core associated with a first power consumption;
execute at least one instruction to cause the processor core to be clocked at a second frequency less than the first frequency and transition to a second power state associated with a second power consumption less than the first power consumption; and
assert a first signal to indicate that the processor core has entered the second power state; and
a clock selection circuit external to the processor core and adapted to respond to the first signal to provide a clock signal to clock the processor core at a third frequency less than the second frequency.

8. The apparatus of claim 7, wherein the first signal indicates that the processor core is in a suspend mode.

9. The apparatus of claim 7, wherein the processor core is adapted to program a register in response to the execution of the at least one instruction by the processor core to cause the processor core to be clocked at the second frequency.

10. The apparatus of claim 7, wherein the processor core is adapted to execute the at least one instruction to disable a phase locked loop (PLL) of a clock source.

11. The apparatus of claim 8, wherein the at least one instruction comprises a WFI instruction or a WFE instruction.

12. A system comprising:
an integrated circuit comprising a processor core and a clock selection circuit other than the processor core, wherein:
the processor core is adapted to operate in a first power state associated with a first power consumption;
the processor core, in response to a wake up signal, executes at least one instruction while being clocked at a first frequency to transition the processor core from the first power state to a second power state associated with a second power consumption greater than the first power consumption;
the processor core provides a first signal to indicate that the processor core has transitioned to the second power state;
the clock selection circuit is adapted to respond to the first signal to provide a clock signal to clock the processor core at a second frequency greater than the first frequency; and
the processor core is adapted to execute at least one instruction while being clocked at the second frequency to cause the processor core to transition to a third frequency greater than the second frequency.

13. The system of claim 12, wherein the wake up signal comprises an interrupt signal.

14. The system of claim 12, wherein the first power state comprises a power state associated with a suspend mode of the processor core.

15. The system of claim 12, wherein the second power state is associated with an active mode of the processor core.

* * * * *